United States Patent
Lee et al.

(10) Patent No.: US 11,945,969 B2
(45) Date of Patent: Apr. 2, 2024

(54) ANTI-GLARE FILM, POLARIZING PLATE AND DISPLAY DEVICE

(71) Applicant: LG CHEM, LTD., Seoul (KR)

(72) Inventors: Hanna Lee, Daejeon (KR); Jung Hyun Seo, Daejeon (KR); Yeongrae Chang, Daejeon (KR); Jaeyoung Kim, Daejeon (KR); Intaek Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 923 days.

(21) Appl. No.: 16/964,374

(22) PCT Filed: Sep. 19, 2019

(86) PCT No.: PCT/KR2019/012164
§ 371 (c)(1),
(2) Date: Jul. 23, 2020

(87) PCT Pub. No.: WO2020/060239
PCT Pub. Date: Mar. 26, 2020

(65) Prior Publication Data
US 2021/0032478 A1  Feb. 4, 2021

(30) Foreign Application Priority Data

Sep. 21, 2018 (KR) .......... 10-2018-0114409
Sep. 18, 2019 (KR) .......... 10-2019-0114792

(51) Int. Cl.
C09D 5/00 (2006.01)
C08J 7/04 (2020.01)
(Continued)

(52) U.S. Cl.
CPC .............. *C09D 5/006* (2013.01); *C08J 7/042* (2013.01); *C09D 7/69* (2018.01); *C09D 133/10* (2013.01);
(Continued)

(58) Field of Classification Search
CPC .......... C09D 5/006; C09D 7/69; G02B 1/111; G02B 1/14; C08J 2433/10; C08J 2367/02
(Continued)

(56) References Cited

U.S. PATENT DOCUMENTS 7,567,383 B2  7/2009  Nagahama et al.
7,751,121 B2  7/2010  Nagahama et al.
(Continued)

FOREIGN PATENT DOCUMENTS

CN  103975258 A  8/2014
CN  107003562 A  8/2017
(Continued)

OTHER PUBLICATIONS

Extended European Search Report issued for European Patent Application No. 19862127.8 dated Jan. 13, 2021, 7 pages.
(Continued)

*Primary Examiner* — Jerry L Brooks
(74) *Attorney, Agent, or Firm* — ROTHWELL, FIGG, ERNST & MANBECK, P.C.

(57) ABSTRACT

The present invention relates to an anti-glare film including: a light-transmitting substrate; and a hard coating layer containing a binder resin and inorganic fine particles dispersed in the binder resin, wherein the anti-glare film has a specific reflection intensity ratio (R), and a polarizing plate and a display device including the anti-glare film.

17 Claims, 1 Drawing Sheet

(51) Int. Cl.
*C09D 7/40* (2018.01)
*C09D 133/10* (2006.01)
*G02B 1/111* (2015.01)
*G02B 1/14* (2015.01)

(52) U.S. Cl.
CPC ............... *G02B 1/111* (2013.01); *G02B 1/14* (2015.01); *C08J 2367/02* (2013.01); *C08J 2433/10* (2013.01)

(58) Field of Classification Search
USPC ........................................................ 359/601
See application file for complete search history.

(56) References Cited

U.S. PATENT DOCUMENTS

| | | | |
|---|---|---|---|
| 7,903,340 B2 | 3/2011 | Nagahama et al. | |
| 8,354,162 B2 | 1/2013 | Yoshihara et al. | |
| 2002/0158853 A1* | 10/2002 | Sugawara | G02B 6/10 345/173 |
| 2010/0027124 A1 | 2/2010 | Nagahama et al. | |
| 2014/0211316 A1 | 7/2014 | Furui et al. | |
| 2015/0116835 A1 | 4/2015 | Ogumi et al. | |
| 2017/0253774 A1 | 9/2017 | Hong et al. | |
| 2018/0313978 A1 | 11/2018 | Chang et al. | |
| 2020/0233119 A1 | 7/2020 | Sugawara et al. | |

FOREIGN PATENT DOCUMENTS

| | | | | |
|---|---|---|---|---|
| CN | 107850692 A | 3/2018 | | |
| EP | 2144094 A1 | 1/2010 | | |
| EP | 3299851 A1 * | 3/2018 | ............... | C08F 12/20 |
| EP | 3299851 A1 | 3/2018 | | |
| JP | 2002-365410 A | 12/2002 | | |
| JP | 2010-036435 A | 2/2010 | | |
| JP | 2010-066549 A | 3/2010 | | |
| JP | 2010-128108 A | 6/2010 | | |
| JP | 2014-059334 A | 4/2014 | | |
| JP | 2014-112257 A | 6/2014 | | |
| JP | 2015-206837 A | 11/2015 | | |
| JP | 2019-105692 A | 6/2019 | | |
| KR | 10-2008-0076768 A | 8/2008 | | |
| KR | 10-2010-0019407 A | 2/2010 | | |
| KR | 10-2015-0120264 A | 10/2015 | | |
| KR | 10-2016-0025121 A | 3/2016 | | |
| TW | 200905252 A | 2/2009 | | |
| WO | 2015-080195 A1 | 6/2015 | | |
| WO | 2016-084729 | 6/2016 | | |

OTHER PUBLICATIONS

International Search Report issued for PCT/KR2019/012164 dated Jan. 3, 2020, 4 pages.

* cited by examiner

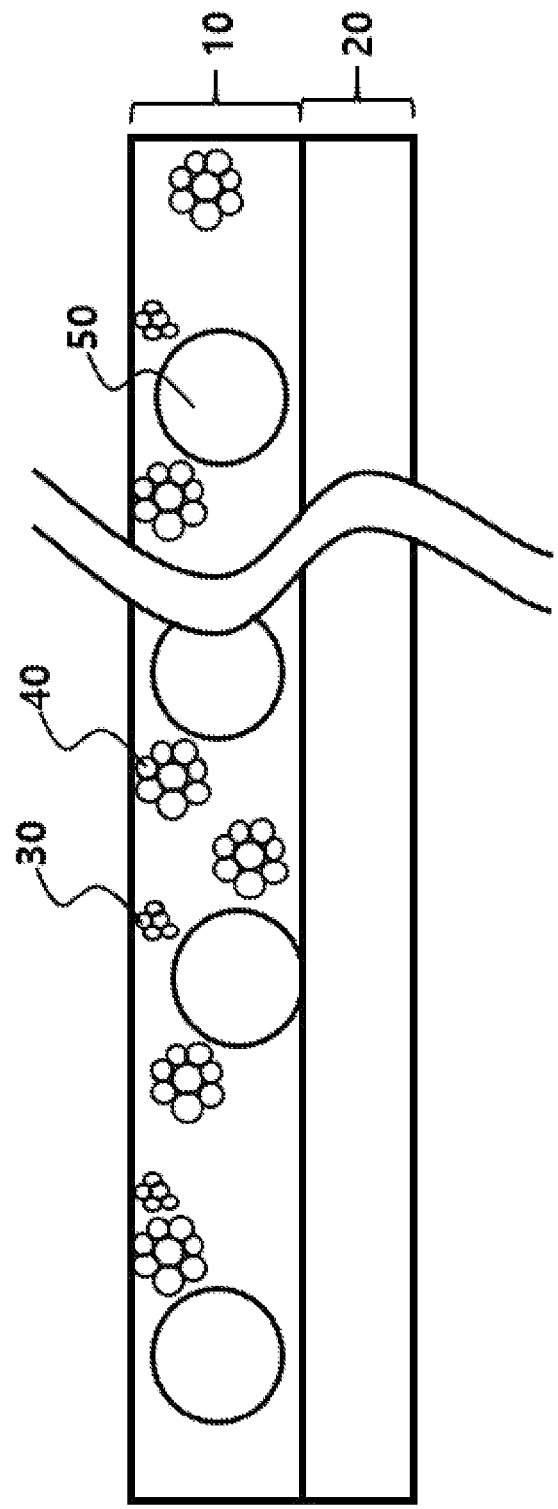

ANTI-GLARE FILM, POLARIZING PLATE AND DISPLAY DEVICE

CROSS-REFERENCE TO RELATED APPLICATION(S)

This application is a 35 U.S.C. 371 National Phase Entry Application from PCT/KR2019/012164 filed on Sep. 19, 2019, designating the United States, which claims the benefit of the filing date of Korean Patent Application No. 10-2018-0114409 filed on Sep. 21, 2018, and the filing date of Korean Patent Application No. 10-2019-0114792 filed on Sep. 18, 2019 with the Korean Intellectual Property Office, the entire contents of which are incorporated herein by reference.

FIELD OF THE INVENTION

The present invention relates to an anti-glare film, a polarizing plate and a display device including the same.

BACKGROUND OF THE INVENTION

As flat panel display technologies are developing toward a large area and high resolution, products are being applied to large area displays such as outdoor advertising boards and electric sign boards for homes and offices such as TVs, monitors, and mobile phones. Flat panel displays (FPDs), including LCDs, PDPs, OLEDs, rear-projection TVs, etc., reflect light on the surface of the monitor when exposed to incident light such as natural light, causing eye fatigue or headaches and blurry vision by the image created in the displays. In order to solve these drawbacks, an anti-glare film in which unevenness is formed on a surface of a display is applied to scatter external light on the surface, or a difference in refractive index between a resin forming a coating film and fine particles is used to induce internal scattering of light.

The anti-glare film applied to the surface of the display device or the like for such a purpose is required to have high image definition and a high contrast ratio as well as the anti-glare function. However, generally, a higher haze value leads to greater diffusion of the external light, which improves the anti-glare effect, but, it also causes image distortion due to surface scattering of light and a whitening phenomenon due to internal scattering of light, consequently deteriorating the contrast ratio. In this way, an increase of the image definition and the contrast ratio deteriorates the anti-glare properties, and an increase of the anti-glare property leads to deterioration in the image definition and the contrast ratio. It is thus considered as an important technique to control such characteristics in the manufacture of an anti-glare film for a high-resolution display.

BRIEF SUMMARY OF THE INVENTION

The present invention provides an anti-glare film that prevents sparkling defects, image formation and spread of light of a lamp while exhibiting a high contrast ratio and excellent image definition, and further has excellent physical properties such as scratch resistance and stain resistance.

The present invention also provides a polarizing plate and a display device that prevent sparkling defects, image formation and spread of light of a lamp while exhibiting a high contrast ratio and excellent image definition, and further have excellent physical properties such as scratch resistance and stain resistance.

In one aspect of the present invention, an anti-glare film is provided, including: a light-transmitting substrate; and a hard coating layer containing a binder resin and inorganic fine particles dispersed in the binder resin, wherein a reflection intensity ratio (R) of the following Equation 1 is 0.6 to 1%.

$$\text{Refection Intensity Ratio }(R)=(R_1/R_2)\times 100 \qquad [\text{Equation 1}]$$

In Equation 1, $R_1$ is a reflection intensity value measured at 45° corresponding to a specular reflection of an incident angle after irradiating light at an incident angle of 45° with respect to a hard coating layer, and $R_2$ is a reflection intensity value measured at 45° corresponding to a specular reflection of the incident angle after irradiating light at an incident angle of 45° with respect to a light-transmitting substrate.

In another aspect of the present invention, a polarizing plate including the above-mentioned anti-glare film is provided.

In still another aspect of the present invention, a display device including the above-mentioned anti-glare film is provided.

BRIEF DESCRIPTION OF THE DRAWINGS

FIG. 1 is a cross-sectional view showing one embodiment of an anti-glare film according to the present invention.

DETAILED DESCRIPTION OF THE INVENTION

Hereinafter, an anti-glare film and a display device including the same according to specific embodiments of the present invention will be described in more detail.

Terms such as first, second, third, and the like may be used to describe various components, and the terms are used only to discriminate one component from another component.

Also, the term "(meth)acrylate" refers to including both acrylate and methacrylate.

In addition, the term "photocurable resin" collectively refers to a polymer resin polymerized by irradiation with light, for example, by irradiation with visible light or ultraviolet light.

In accordance with one embodiment of the invention, an anti-glare film can be provided, including: a light-transmitting substrate; and a hard coating layer containing a binder resin and inorganic fine particles dispersed in the binder resin, wherein a reflection intensity ratio (R) of the following Equation 1 is 0.6 to 1%.

$$\text{Refection Intensity Ratio }(R)=(R_1/R_2)\times 100 \qquad [\text{Equation 1}]$$

In Equation 1, $R_1$ is a reflection intensity value measured at 45° corresponding to a specular reflection of incident angle after irradiating light at an incident angle of 45° with respect to the hard coating layer, and $R_2$ is a reflection intensity value measured at 45° corresponding to a specular reflection of the incident angle after irradiating light at an incident angle of 45° with respect to the light-transmitting substrate.

The present inventors manufactured an anti-glare film that prevents sparkling defects while exhibiting a high contrast ratio and excellent image definition, and further has excellent physical properties such as scratch resistance and stain resistance, by allowing the film to have a specific reflection intensity ratio (R) while inducing the light scattering effect through the inorganic fine particles contained in the hard coating layer. In addition, when the anti-glare film is illuminated with external light, for example, a lamp, a lamp image is not formed so that the lamp image is not clearly visually confirmed, the overall light spread is small, and the afterimage of the lamp is also not visually confirmed.

Specifically, the reflection intensity ratio (R) of the following Equation 1 of the anti-glare film may be 0.6 to 1%, 0.6 to 0.9%, or 0.65 to 0.8%.

$$\text{Refection Intensity Ratio } (R)=(R_1/R_2)\times 100 \quad \text{[Equation 1]}$$

The reflection intensity ratio calculates the percentage of a reflection intensity value ($R_1$) measured for the hard coating layer vs. a reflection intensity value ($R_2$) measured for the light-transmitting substrate.

Specifically, the reflection intensity means that when irradiated with visible light at an angle of 45° from the normal line of the surface to be measured, some light is diffused at 45° corresponding to the specular reflection of the incident angle. At this time, the intensity of light in the specular reflection direction is defined as reflection intensity. In addition, in order to suppress back side reflection and meet the conditions for actual use, a non-transmissive substrate is attached to the back surface to be measured.

The non-transmissive substrate is a substrate that does not transmit light at all, such as visible light having light transmittance of about 0%, and may be, for example, a film coated with a black acrylic sheet, a black straw board, or a black adhesive. The film coated with the black adhesive may be, for example, a polyethylene terephthalate film coated with the black adhesive.

More specifically, in order to measure $R_1$ of the reflection intensity ratio (R), first, a flat, non-transmissive substrate having no unevenness or warpage is attached to one surface of the light-transmitting substrate so as to face the hard coating layer. Subsequently, a light beam is made incident on the hard coating layer surface at an angle of 45° from the normal line of the surface, and the reflection intensity ($R_1$) is measured at 45° corresponding to the specular reflection of the incident angle.

In addition, in order to measure $R_2$ of the reflection intensity ratio (R), only a light-transmitting substrate on which no hard coating layer is formed is prepared, and the non-transmissive substrate is attached to one surface of the light-transmitting substrate. Subsequently, a light beam is made incident on one surface of the light-transmitting substrate to which the non-transmissive substrate is not attached at an angle of 45° from the normal line of the surface, and the reflection intensity ($R_2$) can be measured at 45° corresponding to a specular reflection of the incident angle.

If the reflection intensity ratio (R) is less than 0.6%, the lamp image is not formed when illuminating a lamp, but the degree of spreading of the light is large, and the lamp image may be blurred, resulting in poor visibility of the screen. If the reflection intensity ratio (R) exceeds 1%, the lamp image is formed when illuminating the lamp, thereby causing glare.

The reflection intensity ratio (R) of the anti-glare film may be attributable to an average particle size of three or more kinds of inorganic fine particles/inorganic fine particle aggregates having different average particle sizes contained in the hard coating layer, the difference in average particle sizes therebetween, a volume fraction in which the inorganic fine particles are occupied in the hard coating layer, an average height of the unevenness formed in the hard coating layer, a deviation in the height of the unevenness formed in the hard coating layer, and the like.

Meanwhile, generally, a higher haze value leads to greater diffusion of the external light, which improves the anti-glare effect, while it also causes image distortion due to surface scattering of light and the whitening phenomenon due to internal scattering of light, consequently deteriorating the contrast ratio. On the contrary, the anti-glare film of the embodiment can have a high contrast ratio and excellent image definition by controlling the ratio of internal and external haze while having a high haze value that is not very high, and additionally, it can prevent sparkling defects, image formation and spread of light of a lamp.

Specifically, the ratio of the external haze to the internal haze of the anti-glare film may be 0.5 to 2, 0.8 to 1.8, or 0.8 to 1.6. The ratio of the external haze to the internal haze of the anti-glare film may be attributable to an average particle size of three or more kinds of inorganic fine particles/inorganic fine particle aggregates having different average particle sizes contained in the hard coating layer, a difference in average particle sizes therebetween, a volume fraction in which the inorganic fine particles are occupied in the hard coating layer, a difference in refractive index between the third inorganic fine particles with an average primary particle size of 1 to 10 μm contained in the hard coating layer and the binder resin, and the like.

If the ratio of the external haze to the internal haze is less than 0.5, the anti-glare effect decreases due to insufficient anti-glare visibility, and when the anti-glare film is located under the cover glass, the effect of anti-Newton rings (ANR) due to external unevenness formed on the hard coating layer is reduced and interference fringes are generated, thereby deteriorating optical characteristics. If the ratio of the external haze to the internal haze is greater than 2, the external haze increases, the sparkling phenomenon caused by the external unevenness becomes severe, and the image definition may be decreased.

In the anti-glare film according to the one embodiment, the ratio of the external haze to the reflection intensity ratio (R) may be 10 to 30, 14 to 30, or 18 to 25. The ratio of the external haze to the reflection intensity ratio (R) may be attributable to an average particle size of three or more kinds of inorganic fine particles/inorganic fine particle aggregates having different average particle sizes contained in the hard coating layer, the difference in average particle sizes therebetween, a volume fraction in which the inorganic fine particles are occupied in the hard coating layer, and the like.

If the ratio of the external haze to the reflection intensity ratio (R) is less than 10, the light reflection is larger and anti-glare effects are not exhibited, and, when the anti-glare film is located under the cover glass, the effect of anti-Newton rings (ANR) due to external unevenness formed on the hard coating layer is reduced and interference fringes are generated, thereby deteriorating optical characteristics. If the ratio of the external haze to the reflection intensity ratio (R) is more than 30, the spread of light with respect to the external light is increased, the visibility of the screen is lowered, the sparkling phenomenon due to external unevenness becomes severe, and the image definition may be decreased.

The hard coating layer may have a thickness of 1 to 10 μm or 2 to 8 μm. If the thickness of the hard coating layer is less than 1 μm, it becomes difficult to obtain the desired hardness (degree of hardness), and if the thickness of the hard coating layer is more than 10 μm, it may be curled in the step of curing the resin during the formation of the hard coating layer.

The thickness of the hard coating layer can be obtained by observing a cross-section of the anti-glare film by SEM (scanning electron microscopy) and measuring the thickness of the binder portion of the hard coating layer. Meanwhile, the thickness obtained by the method of subtracting arithmetic mean roughness Ra of the hard coating layer from the thickness of the entire hard coating layer containing inorganic fine particles measured using a thickness measuring instrument (TESA product) substantially coincides with the thickness of the binder portion determined by the SEM observation, and thus, this method can be used.

A fine uneven shape can be formed on the surface of the hard coating layer. Unlike the conventional technique in which individual organic or fine particles are protruded from the hard coat layer to form an uneven shape, the hard coating layer according to the embodiment may be configured so that inorganic fine particles are aggregated in the in-plane direction and the inorganic fine particle aggregates thus formed becomes one convex portion, thus forming fine unevenness on the surface of the hard coating layer. By forming fine unevenness on the surface of the hard coating layer, it is possible to prevent sparkling defects, image formation and spread of light of a lamp while exhibiting a high contrast ratio and excellent image definition.

As shown in FIG. 1, an anti-glare film according to this embodiment includes a light transmitting substrate layer (20) and a hard coating layer (10). The hard coating layer (10) contains a binder resin and inorganic fine particles, which may include a first inorganic fine particle aggregate (30), a second inorganic fine particle aggregate (40), and third inorganic fine particles (50).

Specifically, three or more kinds of different inorganic fine particles may be included in the hard coating layer. For example, the inorganic fine particles may include a first inorganic fine particle aggregate having an average particle size of 1 to 2 μm, a second inorganic fine particle aggregate having an average particle size of 3 to 5 μm, and third inorganic fine particles having an average primary particle size of 1 to 10 μm.

The first inorganic fine particle aggregate and the second inorganic fine particle aggregate may be formed by aggregating the first inorganic fine particles and the second inorganic fine particles in the in-plane direction of the hard coating layer, respectively. In addition, due to the first inorganic fine particle aggregate and the second inorganic fine particle aggregate that are respectively aggregated in the in-plane direction of the hard coating layer, unevenness can be formed on the surface of the hard coating layer. Meanwhile, the third inorganic fine particles are inorganic fine particles that are not aggregated in the hard coating layer, and the internal haze of the hard coating layer may be implemented in a specific range by using a difference in refractive index with the binder resin.

Therefore, since the hard coating layer according to the embodiment includes all of the first inorganic fine particle aggregate having an average particle size of 1 to 2 μm, the second inorganic fine particle aggregate having an average particle size of 3 to 5 μm, and the third inorganic fine particle having an average primary particle size of 1 to 10 μm, it can satisfy the reflection intensity ratio, the ratio of the external haze to the reflection intensity ratio, and the specific ratio of the external haze to the internal haze, and furthermore, it can prevent sparkling defects, image formation and spread of light of a lamp while exhibiting a high contrast ratio and excellent image definition, and can further have excellent physical properties such as scratch resistance and stain resistance.

Meanwhile, when the hard coating layer includes only the first inorganic fine particle aggregate having a relatively small average particle size, the lamp image can be formed, which causes glare. When the hard coating layer includes only the second inorganic fine particle aggregate having a relatively large average particle size, the lamp image may not be formed, but the degree of spreading of the light is large, and the lamp image may be blurred, resulting in poor visibility of the screen.

The average particle size ratio of the second inorganic fine particle aggregate to the first inorganic fine particle aggregate may be 1.5 to 4, 2 to 3.5, or 2 to 3. When the particle size ratio is less than 1.5, the size of the surface unevenness may be small, thus forming a lamp image and causing glare. When the particle size ratio is greater than 4, the degree of spreading of the light is large and the lamp image may be blurred, resulting in poor visibility of the screen and causing sparkling defects.

The weight ratio of the first inorganic fine particle aggregate and the second inorganic fine particle aggregate may be 1:4 to 7. When the weight ratio of the first inorganic fine particle aggregate and the second inorganic fine particle aggregate is less than 1:4, the size of the surface unevenness may be small, thereby forming a lamp image and causing glare. When the weight ratio is greater than 1:7, the degree of spreading of the light may be large and the lamp image may be blurred, resulting in poor visibility of the screen.

The first inorganic fine particle aggregate is one in which the first inorganic fine particles are connected in the shape of a bunch of grapes or the like, and the second inorganic fine particle aggregate may be one in which the second inorganic fine particles are connected in the shape of a bunch of grapes or the like. Therefore, the first inorganic fine particles and the second inorganic fine particles may have an average particle size of 50 nm or less or 10 to 15 nm, the first inorganic fine particle aggregate and the second inorganic fine particle aggregate to which they are connected have less scattering of light and do not cause internal haze, and may realize only external haze by aligning on the surface of the hard coating layer to form unevenness.

The third inorganic fine particles may have a refractive index of 1.400 to 1.480 based on a wavelength of 500 to 600 nm. Due to the inclusion of the third inorganic fine particles in the hard coating layer, it is possible to prevent sparkling defects while exhibiting a high contrast ratio and excellent image definition.

The third inorganic fine particles may implement haze of the anti-glare film in a specific range by using a difference in refractive index with the binder resin in the hard coating layer. Specifically, the difference in refractive index between the third inorganic fine particles and the binder resin may be 0.2 to 1.0 or 0.4 to 1.0. When the difference in refractive index between the third inorganic fine particles and the binder resin is less than 0.2, a large number of particles must be included in order to realize appropriate haze, and thus the image definition may be lowered. When the difference in refractive index is greater than 1.0, there may be a problem that the white turbidity becomes severe. The standard of the refractive index may be a wavelength of 500 to 600 nm.

Conventionally, in order to implement internal haze, organic particles such as PMMA-PS copolymer particles and the like are used, but in this case, excessive organic particles must be used to implement high internal haze. As a result, there may be a problem that the organic particles are exposed to the outside of the film and thereby the scratch resistance is lowered.

However, the third inorganic fine particles included in the hard coating layer of the anti-glare film according to the embodiment can, due to the scratch resistance of the inorganic fine particles themselves, implement excellent scratch resistance compared to the case of conventionally using organic particles.

The content of the third inorganic fine particles may be 30 to 80 parts by weight, 40 to 75 parts by weight, or 50 to 70 parts by weight based on 100 parts by weight of the total weight of the first inorganic fine particle aggregate and the second inorganic fine particle aggregate. When the content of the third inorganic fine particles is less than 30 parts by weight, it is difficult to implement sufficient internal haze at an appropriate thickness. When the content of the third inorganic fine particles is greater than 80 parts by weight, the internal haze may be increased at an appropriate thickness, which may cause a problem that the blackness is lowered and the contrast ratio is lowered.

The inorganic fine particle aggregate and the inorganic fine particles may have a particle form such as a spherical shape, an elliptical shape, a rod shape, or an amorphous shape. In the case of a rod shape or an amorphous shape, the length of the largest dimension can satisfy the particle size in the above range.

In addition, the average particle sizes of the inorganic fine particle aggregate, the inorganic fine particles, etc. can be measured by, for example, a dynamic light scattering method, a laser diffracting method, a centrifugal sedimentation method, an FFF (Field Flow Fractionation) method, a pore electrical resistance method, or the like.

The specific kind of the inorganic fine particles is not limited, but for example, it may be inorganic fine particles consisting of silicon oxide, titanium dioxide, indium oxide, tin oxide, zirconium oxide, and zinc oxide. Specifically, the first inorganic particulate aggregate and the second inorganic particulate aggregate may each independently be an aggregate of silica, titanium dioxide, zirconium oxide, or tin oxide fine particles, and the third inorganic fine particles may be polysilsesquioxane fine particles, more specifically, polyhedral oligomeric silsesquioxane (POSS) fine particles having a cage structure.

In particular, unlike the prior art in which organic particulates are used to realize a specific internal haze, it is possible to improve physical properties such as scratch resistance of the anti-glare film according to the embodiment by using the inorganic fine particles, specifically, the third inorganic fine particles.

The hard coating layer may include in an amount of 2 to 10 parts by weight, 3 to 8 parts by weight, or 4 to 7 parts by weight of the third inorganic fine particles relative to 100 parts by weight of the binder resin. When the content of the third inorganic fine particles relative to the binder resin is less than 2 parts by weight, a haze value due to internal scattering may not be sufficiently implemented, and when the content is greater than 10 parts by weight, the haze value due to internal scattering becomes too large and the contrast ratio may be lowered.

Meanwhile, the binder resin may include a polymer or copolymer of a vinyl-based monomer or a (meth)acrylate-based monomer.

The vinyl-based monomer or the (meth)acrylate-based monomer may include a monomer or an oligomer containing one or more, two or more, or three or more (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. In this case, the molecular weight of the oligomers may be 1000 to 10,000.

Specific examples of the monomer or oligomer containing a vinyl group include divinylbenzene, styrene, and paramethyl styrene.

In addition, the polymer or copolymer contained in the binder resin may further include a part derived from one or more monomers selected from the group consisting of a reactive acrylate oligomer group including a urethane acrylate oligomer, an epoxide acrylate oligomer, a polyester acrylate, and a polyether acrylate; and a polyfunctional acrylate monomer including dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

Meanwhile, in the step of forming the hard coating layer, a method and device conventionally used for coating a photopolymerizable coating composition may be used without particular limitation, and for example, a bar coating method such as Meyer bar method, a gravure coating method, a 2-roll reverse coating method, a vacuum slot die coating method, 2 roll coating method, etc. may be used.

In the step of forming the hard coating layer, ultraviolet rays or visible rays having a wavelength of 200 to 400 nm may be irradiated, and an exposure amount during irradiation may be 100 to 4000 mJ/cm$^2$. The exposure time is also not particularly limited, and may be appropriately changed depending on the exposure device used, the wavelength of the irradiation light, or the exposure amount. Further, in the step of forming the hard coating layer, nitrogen purging or the like may be performed in order to apply nitrogen atmosphere conditions.

Meanwhile, as the light-transmitting substrate, a plastic film having transparency may be used. Examples thereof may include triacetylcellulose (TAC), polyester (TPEE), polyethylene terephthalate (PET), polyimide (PI), polyamide (PA), aramid, polyethylene (PE), polyacrylate (PAR), polyether sulfone, polysulfone, diacetyl cellulose, polypropylene (PP), polyvinyl chloride, acrylic resins (PMMA), polycarbonate (PC), epoxy resins, urea resins, urethane resins, melamine resins, and the like.

Conventionally, the anti-glare film often used triacetyl cellulose as a substrate, but the triacetyl cellulose film is vulnerable to moisture, and in particular, when used in outdoor displays, there is a drawback that the durability is deteriorated. Therefore, the polyethylene terephthalate film with excellent anti-moisture permeability is used as a substrate, but due to the birefringence of polyethylene terephthalate, there is a problem that a rainbow defect must be solved.

However, the light-transmitting substrate included in the anti-glare film according to the embodiment may have in-plane retardation (Re) of 500 nm or less, or 5000 nm or more, as measured at a wavelength of 400 nm to 800 nm, and it may be a polyethylene terephthalate film that satisfies the in-plane retardation. By using such a film as a light-transmitting substrate, the rainbow phenomenon due to the interference of visible light may be alleviated.

The in-plane retardation (Re) can be defined by the following equation where d represents a thickness of the light-transmitting substrate, nx represents a refractive index in the in-plane slow axis direction, and ny represents a refractive index in the in-plane fast axis direction.

$$Re=(nx-ny)*d$$

In addition, the retardation value may be defined as absolute values corresponding to a positive number.

The thickness of the light-transmitting substrate may be 10 to 300 μm in consideration of productivity, but is not limited thereto.

In accordance with another embodiment of the invention, a polarizing plate including the anti-glare film can be provided. The polarizing plate may include a polarizing film and an anti-glare film formed on at least one surface of the polarizing film.

The material and manufacturing method of the polarizing film are not particularly limited, and conventional materials and manufacturing methods known in the art can be used. For example, the polarizing film may be a polyvinyl alcohol polarizing film.

A protective film may be provided between the polarizing film and the anti-glare film. Examples of the protective film are not limited. For example, it may be at least one of a cycloolefin polymer (COP) film, an acrylic film, a triacetylcellulose (TAC) film, a cycloolefin copolymer (COC) film, a polynorbornene (PNB) film, and a polyethylene terephthalate (PET) film.

As the protective film, a substrate for forming a single coating layer during the production of the anti-glare film may be used as it is. The polarizing film and the anti-glare film may be laminated by an adhesive such as an aqueous adhesive or a non-aqueous adhesive.

According to still another embodiment of the invention, a display device including the above-mentioned anti-glare film can be provided.

Specific examples of the display device are not limited, and for example, it may be a device such as a liquid crystal display, a plasma display, or an organic light emitting diode.

As one example, the display device may be a liquid crystal display device including: a pair of polarizing plates facing each other; a thin film transistor, a color filter, and a liquid crystal cell which are sequentially stacked between the pair of polarizing plates; and a backlight unit. In the display device including the anti-glare film, the anti-glare film may be positioned on one surface of the polarizing plate that is relatively far from the backlight unit among the pair of polarizing plates.

In the display device, the anti-glare film may be provided on the outermost surface of a display panel at an observer side or a backlight side. More specifically, the display device may be a laptop display device, a TV display device, and a large area display device for advertisement, and the anti-glare film may be located on the outermost surface of a laptop display device, a TV display device, and a large area display device for advertisement.

Advantageous Effects

According to the present invention, there can be provided an anti-glare film that prevents sparkling defects, image formation and spread of light of a lamp while exhibiting high contrast ratio and excellent image definition, and further has excellent physical properties such as scratch resistance and stain resistance; and a polarizing plate and a display device that prevent sparkling defects, image formation and spread of light of a lamp while exhibiting a high contrast ratio and excellent image definition, and further have excellent physical properties such as scratch resistance and stain resistance.

Detailed Description of the Embodiments

The present invention will be described in more detail with reference to the following examples. However, these examples are given for illustrative purposes only, and the scope of the invention is not intended to be limited to or by these examples.

Examples and Comparative Examples: Preparation of Anti-Glare Film (1) Preparation of Composition for Forming Hard Coating Layer (1-1) Preparation Example 1

50 parts by weight of pentaerythritol tri(tetra)acrylate (SK Entis) and 50 parts by weight of EB-1290 (photocurable aliphatic urethane hexaacrylate, SK Entis) were prepared as a binder. Based on 100 parts by weight of the binder, 5 parts by weight of IRG184 (initiator, Irgacure 184, hydroxycyclohexyl phenyl ketone, Ciba Specialty Chemicals, Switzerland), 50 parts by weight of toluene (solvent), 50 parts by weight of MEK (solvent, methyl ethyl ketone), 1.5 parts by weight of SS-50 (first inorganic fine particle aggregate, surface-treated hydrophobic silica aggregate, average secondary particle size of 1~2 μm, Tosoh Silica Corp.), 6 parts by weight of Acematt 3600 (second inorganic fine particle aggregate, silica aggregate, average secondary particle size (particle aggregate) of 3~5 μm, Evonik Degus Co.), and 5 parts by weight of T145A (third inorganic fine particles, POSS (silsesquioxane), average primary particle size of 5 μm, refractive index of 1.42, Toshiba) was prepared. They were mixed to prepare a composition for forming a hard coating layer of Preparation Example 1.

(1-2) Preparation Example 2

50 parts by weight of pentaerythritol triacrylate (SK Entis) and 50 parts by weight of trimethylolpropane triacrylate were prepared as a binder. Based on 100 parts by weight of the binder, 5 parts by weight of IRG184 (initiator, Irgacure 184, hydroxycyclohexyl phenyl ketone, Ciba Specialty Chemicals, Switzerland), 50 parts by weight of toluene (solvent), 50 parts by weight of MEK (solvent, methyl ethyl ketone), 1.5 parts by weight of SS-60 (first inorganic fine particle aggregate, surface-treated hydrophobic silica, average secondary particle size of 1~2.2 μm, Tosoh Silica Corp.), 7 parts by weight of SS230 (second inorganic fine particle aggregate, silica, average secondary particle size of 3~5 μm, S-Chemtech Co., Ltd.), and 5.8 parts by weight of T2008B (third inorganic fine particles, POSS (silsesquioxane), average primary particle size of 6 μm, refractive index of 1.42, Toshiba) was prepared. They were mixed to prepare a composition for forming a hard coating layer of Preparation Example 2.

(1-3) Preparation Example 3

50 parts by weight of pentaerythritol triacrylate (SK Entis) and 50 parts by weight of trimethylolpropane triacrylate were prepared as a binder. Based on 100 parts by weight of the binder, 5 parts by weight of IRG184 (initiator, Irgacure 184, hydroxycyclohexyl phenyl ketone, Ciba Specialty Chemicals, Switzerland), 50 parts by weight of toluene (solvent), 50 parts by weight of MEK (solvent, methyl ethyl ketone), 1.2 parts by weight of SS-60 (first inorganic fine particle aggregate, surface-treated hydrophobic silica, average secondary particle size of 1~2.2 μm, Tosoh Silica Corp.), 6 parts by weight of Acematt 3600 (second inorganic fine particle aggregate, silica aggregate, average secondary particle size of 3~5 μm, Evonik Degus Co.), and 4 parts by weight of T120 (third inorganic fine particles, POSS (silsesquioxane), average primary particle size of 2 μm, refractive index of 1.42, Toshiba) was prepared. They were mixed to prepare a composition for forming a hard coating layer of Preparation Example 3.

(1-4) Preparation Example 4

A composition for forming a hard coating layer was prepared in the same manner as in Preparation Example 1, except that 17 parts by weight of PS-PMMA (polystyrene-polymethyl methacrylate copolymer particles, refractive index of 1.555) having an average primary particle size of 5 μm, and 3.7 parts by weight of PS-PMMA (polystyrene-polymethyl methacrylate copolymer particles, refractive index 1.515) having an average primary particle size of 3.5 μm were used instead of 1.5 parts by weight of SS-50, 6 parts by weight of Acematt 3600, and 5 parts by weight of T145A.

(1-5) Preparation Example 5

A composition for forming a hard coating layer was prepared in the same manner as in Preparation Example 1, except that 9.5 parts by weight of SS-50 and 15 parts by weight of PS-PMMA (polystyrene-polymethyl methacrylate copolymer particles, refractive index of 1.555) having an average primary particle size of 5 μm was used instead of 1.5 parts by weight of SS-50, 6 parts by weight of Acematt 3600, and 5 parts by weight of T145A.

(1-6) Preparation Example 6

A composition for forming a hard coating layer was prepared in the same manner as in Preparation Example 2, except that 10 parts by weight of T145A and 10 parts by weight of PS-PMMA (polystyrene-polymethyl methacrylate copolymer particles, refractive index of 1.515) having an average primary particle size of 3.5 μm was used instead of 1.5 parts by weight of SS-60, 7 parts by weight of SS230, and 5.8 parts by weight of T2000B.

(1-7) Preparation Example 7

A composition for forming a hard coating layer was prepared in the same manner as in Preparation Example 1, except that 12 parts by weight of Acematt 3600 and 10 parts by weight of T2000B were used instead of 1.5 parts by weight of SS-50, 6 parts by weight of Acematt 3600, and 5 parts by weight of T145A.

(1-8) Preparation Example 8

A composition for forming a hard coating layer was prepared in the same manner as in Preparation Example 1, except that 10 parts by weight of SS-50F (first inorganic fine particle aggregate, surface-treated hydrophobic silica, average secondary particle size of 1~2 μm, Tosoh Silica Corp.), and 15 parts by weight of T145A were used instead of 1.5 parts by weight of SS-50, 6 parts by weight of Acematt 3600, and 5 parts by weight of T145A.

(2) Preparation of Anti-Glare Film

The hard coating composition of Preparation Examples 1 to 8 thus obtained was coated onto a light-transmitting substrate of Table 2 below with a #10 mayer bar and dried at 90° C. for 1 minute. The dried product was irradiated with ultraviolet light of 150 mJ/cm² to form a hard coating layer, thereby preparing an anti-glare film. At this time, the thickness of the hard coating layer is shown in Table 1 below.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Composition for forming hard coating layer | Preparation Example 1 | Preparation Example 2 | Preparation Example 3 | Preparation Example 4 | Preparation Example 5 | Preparation Example 6 | Preparation Example 7 | Preparation Example 8 |
| Thickness of hard coating layer (μm) | 5 | 5 | 5 | 5 | 5 | 7 | 6 | 6 |
| Light-transmitting substrate (in-plane retardation, unit: nm) | SRF PET[17] (Re > 5000) | PET (Re < 500) | SRF PET (Re > 5000) | SRF PET (Re > 5000) | SRF PET (Re > 5000) | SRF PET (Re > 5000) | SRF PET (Re > 5000) | SRF PET (Re > 5000) |

17. SRF PET: Super Retarder Film Polyethylene terephthalate, Toyobo product, thickness of 2 μm Experimental Example 1. Evaluation of Light Transmittance and Internal/External Haze A specimen with a size of 4 cm×4 cm was prepared from the anti-glare film obtained in each of examples and comparative examples, and the average value was measured three times with a haze meter (HM-150, a light source, Murakami Color Research Laboratory), which was calculated as a total haze value. In the measurement, the light transmittance and the haze value were measured at the same time. The light transmittance was measured according to JIS K 7361, and the haze value was measured according to JIS K 7136.

In measuring the internal haze value, an adhesive film having a total haze value of 0 was attached to the coated surface of the optical film to be measured to make the unevenness of the surface smooth, and then internal haze value was measured in the same manner as that of the total haze value. The external haze value was calculated as the average of the values obtained by calculating the difference between the total haze value and the measured value of the internal haze. The results are shown in Table 2 below.

2. Evaluation of Reflective Intensity Ratio

A polyethylene terephthalate film coated with a flat black adhesive having no unevenness or warpage was attached to one surface of the light-transmitting substrate so as to face the hard coating layer of the anti-glare film obtained in each of the examples and comparative examples, thereby preparing a sample. Subsequently, the specimen was placed on a goniometer (GC5000L, Nippon Denshoku Industries Co., Ltd.), and a light beam was made incident on the surface of the hard coating layer of the specimen at an angle of 45° from the normal line of the surface. After the light beam was made incident on the surface of the hard coating layer, the reflection intensity ($R_1$) was measured at 45° corresponding to the specular reflection of the incident angle.

In addition, in the examples and comparative examples, the light-transmitting substrate on which the hard coating layer was not formed, specifically, the light-transmitting substrate of Table 1, was prepared. A polyethylene terephthalate film coated with flat black adhesive having no unevenness or warpage was attached to one surface of the light-transmitting substrate to prepare a sample. The reflection intensity ($R_2$) was measured in the same manner as in the method of measuring the reflection intensity ($R_1$).

The measured reflection intensities $R_1$ and $R_2$ were substituted into the following Equation 1 to calculate the reflection intensity ratio (R), and the results are shown in Table 2 below.

$$\text{Reflection Intensity Ratio } (R) = (R_1/R_2) \times 100 \quad \text{[Equation 1]}$$

3. Evaluation of Visuality (Lamp Image Formation)

A polyethylene terephthalate film coated with a flat black adhesive and having no unevenness or warpage was attached to one surface of the light-transmitting substrate so as to face the hard coating layer of the anti-glare film obtained in each of the examples and comparative examples, thereby preparing a sample. Subsequently, the visuality was measured by observing the visual field from the specular reflection direction in each anti-glare film using the fluorescent lamp illumination having two rows of lamps as a light source, and distinguishing the image of the reflected image of the fluorescent lamp. The visuality evaluation criteria were as described below, and the results are shown in Table 2 below.

Excellent: No lamp image observed
Defective: Lamp image clearly observed.

4. Evaluation of Light Spread

A polyethylene terephthalate film coated with a flat black adhesive having no unevenness or warpage was attached to one surface of the light-transmitting substrate so as to face the hard coating layer of the anti-glare film obtained in each of the examples and comparative examples, thereby preparing a sample. Subsequently, when a light of a 4 mm lamp size was illuminated at a height of 20 cm, the spread of the light was evaluated by the size of the image appearing on the specimen. Specifically, the evaluation criteria of the spread of the light were evaluated as described below according to the size of the image, and the results are shown in Table 2 below.

5. Scratch Resistance Evaluation

When the anti-glare film obtained in each of the examples and comparative examples were reciprocated 50 times under a load of 500 gf/cm² using flannel cotton, the scratch resistance was evaluated by checking whether scratches occurred on the surface. Evaluation criteria of the scratch resistance were as described below, and the results are shown in Table 2 below.

Excellent: No scratch occurred
Defective: Scratch occurred

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Transmittance | 90.2 | 90.3 | 90.2 | 91.2 | 90.5 | 90.7 | 90.0 | 90.4 |
| Internal haze (%) | 12.2 | 17 | 13 | 12 | 10 | 13 | 11 | 21 |
| External haze (%) | 16 | 15 | 15 | 14 | 15 | 7 | 23 | 15 |
| External haze/Internal haze | 1.31 | 0.88 | 1.15 | 1.17 | 1.5 | 0.54 | 2.09 | 0.71 |
| Reflection intensity ratio (%) | 0.65 | 0.77 | 0.67 | 4.2 | 1.1 | 5.7 | 0.41 | 1.2 |
| External haze / reflection intensity ratio | 24.62 | 19.48 | 22.39 | 3.33 | 13.64 | 1.23 | 56.10 | 12.5 |
| Visuality | excellent | excellent | excellent | defective | defective | defective | excellent | defective |
| Light spread | excellent | excellent | excellent | excellent | excellent | excellent | defective | excellent |
| Scratch resistance | excellent | excellent | excellent | defective | defective | defective | excellent | excellent |

According to Table 2, it was confirmed that in the anti-glare films of Examples 1 to 3 having the reflection intensity ratio of 0.6 to 1%, the ratio of the external haze to the reflection intensity ratio of 10 to 30, and the ratio of the external haze to the internal haze of 0.5 to 2, the formation of the lamp image and the spread of the light did not occur and the scratch resistance was excellent.

On the other hand, it was confirmed that in Comparative Examples 1 to 5, not satisfying the above-described numerical ranges, the formation of the lamp image occurred or the spread of the light occurred.

What is claimed is:

1. An anti-glare film comprising: a light-transmitting substrate; and a hard coating layer containing a binder resin and inorganic fine particles dispersed in the binder resin,
   wherein a reflection intensity ratio (R) of Equation 1 is 0.6 to 1%, and
   a ratio of an external haze to the reflection intensity ratio (R) of the anti-glare film is 10 to 30:

$$\text{Reflection Intensity Ratio } (R) = (R_1/R_2) \times 100 \qquad [\text{Equation 1}]$$

wherein, in the Equation 1,
   $R_1$ is a reflection intensity value measured at 45° corresponding to a specular reflection of the incident angle after irradiating light at an incident angle of 45° with respect to the hard coating layer, and
   $R_2$ is a reflection intensity value measured at 45° corresponding to a specular reflection of the incident angle after irradiating light at an incident angle of 45° with respect to the light-transmitting substrate.

2. The anti-glare film according to claim 1, wherein a ratio of the external haze to an internal haze of the anti-glare film is 0.5 to 2.

3. The anti-glare film according to claim 1, wherein the inorganic fine particles include:
   a first inorganic fine particle aggregate having an average size of 1 to 2 μm;
   a second inorganic fine particle aggregate having an average size of 3 to 5 μm; and
   third inorganic fine particles having an average primary particle size of 1 to 10 μm.

4. The anti-glare film according to claim 3, wherein a ratio of the average particle size of the second inorganic fine particle aggregate to the average size of the first inorganic fine particle aggregate is 1.5 to 4.

5. The anti-glare film according to claim 3, wherein the first inorganic fine particle aggregate is an aggregate in which the first inorganic fine particles are aggregated, and
   the second inorganic fine particle aggregate is an aggregate in which the second inorganic fine particles are aggregated,
   wherein the first inorganic fine particles and the second inorganic fine particles have an average particle size of 50 nm or less.

6. The anti-glare film according to claim 3, wherein the third inorganic fine particles have a refractive index of 1.400 to 1.480 based on a wavelength of 500 to 600 nm.

7. The anti-glare film according to claim 3, wherein a difference in refractive index between the third inorganic fine particles and the binder resin is 0.2 to 1.0.

8. The anti-glare film according to claim 1, wherein the hard coating layer has a thickness of 1 to 10 μm.

9. The anti-glare film according to claim 1, wherein the binder resin includes a polymer or copolymer of a vinyl-based monomer or a (meth)acrylate-based monomer.

10. The anti-glare film according to claim 3, wherein the hard coating layer includes in an amount of 2 to 10 parts by weight of the third inorganic fine particles relative to 100 parts by weight of the binder resin.

11. The anti-glare film according to claim 3, wherein a weight ratio of the first inorganic fine particle aggregate and the second inorganic fine particle aggregate is 1:4 to 7.

12. The anti-glare film according to claim 1, wherein the light-transmitting substrate has an in-plane retardation (Re) of 500 nm or less, or 5000 nm or more, as measured at a wavelength of 400 nm to 800 nm.

13. The anti-glare film according to claim 12, wherein the light-transmitting substrate is a polyethylene terephthalate film.

14. A polarizing plate comprising the anti-glare film according to claim 1.

15. A display device comprising the anti-glare film according to claim 1.

16. The anti-glare film according to claim 9, wherein the vinyl-based monomer or the (meth)acrylate-based monomer includes a monomer or an oligomer containing one or more (meth)acrylate or vinyl groups and wherein the monomer or the oligomer containing one or more (meth)acrylate is at least one monomer or oligomer selected from the group of pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, a urethane-modified acrylate oligomer, an epoxide acrylate oligomer, an ether acrylate oligomer, and a dendritic acrylate oligomer.

17. The anti-glare film according to claim 1, wherein the light-transmitting substrate is selected from the group of triacetylcellulose (TAC), polyester (TPEE), polyethylene terephthalate (PET), polyimide (PI), polyamide (PA), aramid, polyethylene (PE), polyacrylate (PAR), polyether sulfone, polysulfone, diacetyl cellulose, polypropylene (PP), polyvinyl chloride, acrylic resins (PMMA), polycarbonate (PC), epoxy resins, urea resins, urethane resins, and melamine resins.

* * * * *